United States Patent [19]

Dunton

[11] 4,231,801

[45] Nov. 4, 1980

[54] CEMENT AND CONCRETE MIXTURE

[75] Inventor: Harvey R. Dunton, Anaheim, Calif.

[73] Assignee: Associated Concrete Products, Inc., Santa Ana, Calif.

[21] Appl. No.: 942,310

[22] Filed: Sep. 14, 1978

[51] Int. Cl.³ .................................................. C04B 31/02
[52] U.S. Cl. ........................................ 106/97; 106/103
[58] Field of Search .................... 106/89, 97, 100, 103

[56] References Cited

U.S. PATENT DOCUMENTS 3,825,433   7/1974   Schneider-Arnoldi ................ 106/89

FOREIGN PATENT DOCUMENTS

| 44-4223 | 2/1969 | Japan | 106/89 |
|---|---|---|---|
| 53-28451 | 8/1978 | Japan | 106/97 |
| 1208954 | 10/1970 | United Kingdom | 106/100 |
| 381626 | 6/1970 | U.S.S.R. | 106/100 |

*Primary Examiner*—G. O. Peters
*Attorney, Agent, or Firm*—Knobbe, Martens

[57] ABSTRACT

A novel cement and concrete mixture is disclosed, which incorporates the spent catalysts from hydrocracking gasoline in partial substitution for the cementing agent.

5 Claims, No Drawings

CEMENT AND CONCRETE MIXTURE

BACKGROUND OF THE INVENTION

The disclosed invention relates generally to concrete mixtures.

Due to its strength, durability, and relatively low cost, concrete remains probably the most important building material used today.

Concrete is simply a mixture of fine and coarse aggregate which is bound together by a cementing agent. The coarse aggregate is often gravel and the fine aggregate is often sand. The cementing agent can be any one of a number of commonly used cements, such as Portland cement, hydraulic limes, natural cement, masonry cement, Pozzolan cement and slag cement, probably the most common being Portland cement.

A chemical analysis of Portland cement as shown in the following Table 1, indicates that the composition of Portland cement varies depending upon the type of rock which is used to manufacture it and in which part of the country this rock is mined.

TABLE 1

ANALYSIS OF PORTLAND CEMENTS[a]

| WHERE MADE | MADE FROM | $SiO_2$ | $Fe_2O_3$ | $Al_2O_3$ | CaO | MgO | $SO_3$ | Loss |
|---|---|---|---|---|---|---|---|---|
| New Jersey | Cement rock and | 21.82 | 2.51 | 8.03 | 62.19 | 2.71 | 1.02 | 1.05 |
| Pennsylvania | limestone | 21.94 | 2.37 | 6.87 | 60.25 | 2.78 | 1.38 | 3.55 |
| Michigan | Marl and clay | 22.71 | 3.54 | 6.71 | 62.18 | 1.12 | 1.21 | 1.58 |
| Ohio | | 21.86 | 2.45 | 5.91 | 63.09 | 1.16 | 1.59 | 2.98 |
| Virginia | | 21.31 | 2.81 | 6.54 | 63.01 | 2.71 | 1.42 | 2.01 |
| Missouri | Limestone and clay | 23.12 | 2.49 | 6.18 | 63.47 | 0.88 | 1.34 | 1.81 |
| Pennsylvania[b] | | 23.56 | 0.30 | 5.68 | 64.12 | 1.54 | 1.50 | 2.92 |
| Illinois | | 22.41 | 2.51 | 8.12 | 62.01 | 1.68 | 1.40 | 1.02 |
| Germany | Blast furnace slag | 20.48 | 3.88 | 7.28 | 64.03 | 1.76 | 2.46 | |
| Belgium | limestone | 23.87 | 2.27 | 6.91 | 64.49 | 1.04 | 0.88 | |
| France | | 22.30 | 3.50 | 8.50 | 62.80 | 0.45 | 0.70 | |
| England | | 19.75 | 5.01 | 7.48 | 61.39 | 1.28 | 0.96 | |
| Germany[c] | Iron ore and limestone | 20.5 | 11.0 | 1.5 | 63.5 | 1.5 | 1.0 | |

[a]From Meade's "Portland cement."
[b]White Portland cement.
[c]Seawater cement.

The key ingredients of the Portland cement are calcium oxide (lime), silicon dioxide and aluminium oxide (alumina). With reference to the chemical analysis of Portland cement in Table 1, one can see that with respect to the key ingredients, the relative portion of silicon dioxide to aluminum oxide is approximately 3:1 and the proportion of calcium oxide to the sum of the silicon oxide and aluminum oxide is approximately 2:1.

When water is mixed with the Portland cement, the product sets in a few hours and hardens over a period of weeks. The initial setting is caused by the interaction of water and tri-calcium aluminate, $3CaO.Al_2O_3$. The subsequent hardening and development of cohesive strength are due to the interaction of water and tri-calcium silicate, which is $3CaO.SiO_2$. These compounds are in the form of gelantinous hydrated products which surround and cement together the individual coarse and fine aggregates. There is also some vary slow setting due to the hydration of di-calcium silicate, $2CaO.SiO_2$, however, the ultimate cementing agent is probably gelantinous hydrated silica, $SiO_2.^2$ Another type of commonly used cement besides Portland cement is slag cement, which is a mixture of granulated blast furnace slag and hydrated lime. Depending on the ultimate end use for the concrete in building, slag cement may be used as substitute for Portland cement.

An object of the disclosed invention was to discover a partial substitute for the cementing agent, i.e., Portland cement or slag cement, which could be incorporated as an additive to the cement at a greatly reduced cost, to produce a concrete with as great or greater strength than known concretes and also be ecologically favorable to the environment.

These goals have been achieved through the discovery of the utilization of catalyst fines as an additive to the cementing agent in concrete mixtures. As used herein the terms "fines" or "catalyst fines" refers to fine particles produced from spent catalysts used in cracking gasoline. "Catalysts fines" is a term of art well known in the petroleum cracking industry field. For example, in the May 26, 1975 issue of the *Oil and Gas Journal*, page 96, the authors wrote as follows:

"Attention is now turning towards the effect of equipment design on the production of catalyst fines. Identifying where attrition takes place in a fluidcracking unit could lead to design changes which will reduce catalyst-fines production."

Therefore, it is clear that catalyst fines are considered such as burdensome waste product in the petroleum industry that efforts are being made to reduce the attrition rate of catalysts in order to cut down on production of the catalyst fines.

With few exceptions, all commercial cracking catalysts are based upon silica-alumina combinations of one type or another. It is this alumina-silica combination in catalyst fines which allows them to be used as an additive to cements in making concrete. Therefore, catalyst fines which may be used in the disclosed invention must be produced from the aluminosilicate type cracking catalyst. Basically there are three classes of silica-alumina catalysts in the petroleum industry: (1) the acid-treated natural alumino-silicates; (2) the amorphous synthetic silica-alumina combinations; and (3) the crystalline, synthetic silica-alumina combinations.

Charles L. Thomas, in his book, *Catalytic Processes and Proven Catalysts* (1970 Academic Press) which is herein incorporated by reference, at pages 29–35, lists the commercially used alumino-silica catalysts. One of the sources of variance in these catalysts is the percentage of $Al_2O_3$. In general, the composition of these catalysts consists of from about 13% $Al_2O_3$ to up to about 51% $Al_2O_3$ (with the balance being essentially silica). Other sources of variance are surface area, pore volume and the like characteristics. These types of subtleties which would be important in the petroleum industry for the maximum of efficiency of the catalyst are not of concern to the present invention. In short, any of the catalysts which would contain about 10% to about 51% alumina with the balance being silica would be acceptable to the present invention.

The disclosed invention represents a revolutionary concrete mixture which incorporates these heretofore useless and burdensome catalyst fines.

SUMMARY OF THE INVENTION

The disclosed invention incorporates the use of catalyst fines in concrete mixtures. The invention is to use the catalyst fines as a partial substitute for the cementing agent which is then added to coarse and fine aggregates to form concrete. From about 1% up to about 25% by weight of catalyst fines may be used in the cement mixture with the resulting concrete possessing no loss in compressive strength compared to previously known concrete. The resulting concrete is more economical to manufacture, and possesses other desirable qualities in addition to strength. The addition of the fines allows the use of less water in the concrete mixture thereby producing a denser product which is more aesthetically pleasing to the eye. The concrete also possesses better finishability and flowability (more fluidity) then previous concretes.

DETAILED DESCRIPTION OF THE INVENTION

The catalyst fines used as an additive to the cementing agent in the disclosed invention may be produced from any of the alumino-silicate catalysts used in cracking petroleum. These catalysts, which are well known to those in the petroleum field, contain from about 13% $Al_2O_3$ to about 51% $Al_2O_3$. It has been found particularly useful to employ the fines from an alumino-silicate catalyst containing about 33% $Al_2O_3$. Examples of these cracking catalysts which would produce suitable fines for the disclosed invention are as follows and are to be considered representative only:

A. Class 1. Acid-Treated Natural Aluminosilicates and semisynthetics
American Cyanamid Company
Aerocat 2000: a semisynthetic fluid catalyst containing 35% $Al_2O_3$. The ABD is 0.60, the surface area 300 $m^2gm^{-1}$, and the pore volume 0.50 $cm^3gm^{-1}$.
Davison Chemical Division of W. R. Grace & Co.
Grade SS: a semisynthetic fluid catalyst containing 32% $Al_2O_3$. It is supplied in two different pore volume grades: 0.58 $cm^3gm^{-1}$ (ABD 0.51) and 0.70 $cm^3gm^{-1}$ (ABD 0.47). The surface area of the latter is 280 $m^2gm^{-1}$.
Filtrol Corporation
Grade 58: 17.5% $Al_2O_3$, fluid. The ABD is 0.65, the surface area 280-300 $m^2gm^{-1}$, and the pore volume 0.36 $cm^3gm^{-1}$.
Grade 62: 17.5% $Al_2O_3$ as 3/16×3/16 inch pellets. The ABD is 0.8, the surface area 280-300 $m^2gm^{-1}$, and the pore volume 0.36 $cm^3gm^{-1}$.
Grade 63: 38% $Al_2O_3$ as 3/16×3/16 inch pellets. The ABD is 0.8, the surface area 280-300 $m^2gm^{-1}$, and the pore volume 0.27 $cm^3gm^{-1}$.
Grade 80: 38% $Al_2O_3$, fluid. The ABD is 0.73, the surface area 125-135 $m^2gm^{-1}$, and the pore volume 0.27 $cm^3gm^{-1}$.
Grade 100: 51% $Al_2O_3$, microspheres. The ABD is 0.30, the surface area 105 $m^2gm^{-1}$, and the pore volume 0.37 $cm^3gm^{-1}$.
Grade 110: pellets.
Grade 110: Spherical pellets.
Houdry Process and Chemical Company
Kao-Pellets: approximately 3/16×3/16 inch. The ABD is 0.77 and the surface area 90-100 m:$gm^{-1}$.
Kao-Spheres: 45% $Al_2O_3$, ca. 0.17 inch in diameter. The ABD is 0.77 and the surface area 90-100 $m^2gm^{-1}$.
Nalco Chemical Company
Nalcat 783: a semisynthetic fluid catalyst, 33% $Al_2O_3$. The ABD is 0.50, the surface area 280 $m^2gm^{-1}$, and the pore volume 0.65-0.70 $cm^3gm^{-1}$.

B. Class 2. Amorphous Synthetic Silica-Alumina, Including Silica-Magnesia
American Cyanamid Company
Aerocat: 13% $Al_2O_3$, fluid. The ABD is 0.49 and the pore volume 0.75 $cm^3gm^{-1}$.
Aerocat Triple A: 25% $Al_2O_3$, fluid. The ABD is 0.43 and the pore volume 0.89 $cm^3gm^{-1}$.
Aerocat 3C-12: 3% MgO in low alumina, fluid.
Aerocat eC-20: 3% MgO in high alumina, fluid.
Davison Chemical Division of W. R. Grace & Co.
Low Alumina: 13% $Al_2O_3$, fluid. The ABD is 0.43 and the pore volume 0.77 $cm^3gm^{-1}$.
High Alumina: 28% $Al_2O_3$, fluid, in three different pore volumes: 0.70 $cm^3gm^{-1}$ (ABD 0.46), 0.78 $cm^3gm^{-1}$ (ABD 0.43), 0.88 $cm^3gm^{-1}$ (ABD 0.39).
SM-30: 27.5% MgO and 3% F, fluid. The ABD is 0.49 and the pore volume 0.72 $cm^3gm^{-1}$.
Houdry Process and Chemical Company
S-46: 13% $Al_2O_3$, tablets. The ABD is 0.62, the surface area 280-315 $m^2gm^{-1}$, and pore volume 0.61 $cm^3gm^{-1}$.
Mobil Chemical Company
Durabead 1: 10% $Al_2O_3$, spheres (beads).
Nalco Chemical Company
Nalcat Low Alumina: 13% $Al_2O_3$, fluid. The ABD is 0.40, the surface area 520 $m^2gm^{-1}$, and the pore volume 0.80-0.85 $cm^3gm^{-1}$.
Nalcat High Alumina: 25% $Al_2O_3$, fluid. The ABD is 0.40-0.44, the surface area 440 $m^2gm^{-1}$, and the pore volume 0.8-0.9 $cm^3gm^{-1}$.
Universal Oil Products Company
Type FC-2: 13% $Al_2O_3$, fluid.
Type FC-3: 25% $Al_2O_3$, fluid.

C. Class 3. Crystalline Synthetic Silica-Alumina Combinations
American Cyanamide Company
Aerocat S-4: contains rare earth exchanged "Y" type molecular sieve in a semisynthetic matrix of 33% $Al_2O_3$ content, fluid. The ABD is 0.53, the surface area 330 $m^2gm^{-1}$, and the pore volume 0.57 $cm^3gm^{-1}$.
Aerocat TS-150: contains rare earth exchanged "Y" type molecular sieve in a matrix of synthetic silica-alumina (15% $Al_2O_3$), fluid The ABD is 0.49, the surface are 600 $m^2gm^{-1}$, and the pore volume 0.65 $cm^3gm^{-1}$.
Aerocat TS-170 and TS-260: contain rare earth exchanged "Y" type molecular sieve in a semisynthetic matrix with approximately 33% $Al_2O_3$ content, fluid. The ABD is 0.55 and the pore volume 0.58 $cm^3gm^{-1}$.
Davison Chemical Division of W. R. Grace & Co.
XZ-15: 13% $Al_2O_3$, fluid. The ABD is 0.40, the surface area 500 $m^2gm^{-1}$, and the pore volume 0.88 $cm^3gm^{-1}$.

XZ-25: 36% $Al_2O_3$, fluid. The ABD is 0.5, the surface area 340 $m^2gm^{-1}$ and the pore volume 0.60 $cm^3gm^{-1}$.

XZ-36: 36% $Al_2O_3$, fluid. The ABD is 0.55 and the pore volume 0.55 $cm^3gm^{-1}$.

XZ-40: fluid.

Filtrol Corporation

Grade 800: microspheres, 48% $Al_2O_3$. The ABD is 0.69, the surface area 210 $m^2gm^{-1}$, and the pore volume 0.39 $cm^3gm^{-1}$.

Grade 810: pellets.

Houdry Process and Chemical Company

HZ-1: pellets.

Mobil Chemical Company

Durabead 6B and Durabead 8: as spheres (beads); D-5 and D-7: fluid.

Nalco Chemical Company

KSF Series: "X" type molecular sieve in a matrix, fluid.

KSG Series: "Y" type molecular sieve in a matrix, fluid.

ND-2: low surface area, "Y" type molecular sieve in a matrix, fluid.

The "cementing agent" is herein defined as any of the cements well known in the art such as Portland cement, slag cement, Pozzolan cement, hydraulic limes, or Masonary cement. Preferably the cement is Portland cement or a mixture of Portland cement and slag cement.

From about 1% up to about 25% by weight of the catalyst fines may be added to the cementing agent without a loss in the compressive strength of the resulting concrete. Preferably, about 20–25% catalyst fines additive is employed.

The fines and cementing agent are then added to coarse and fine aggregate. In order to produce concrete, water is added to the mixture with a water reducing agent as is well known to those in the field.

The following illustrative examples indicate the satisfactory results which were obtained from the use of catalyst fines as an additive to cement in producing concrete.

Table 2 illustrates the use of various percentages of catalysts fines as an additive to Portland cement and the various compressive strength results which were obtained over a period of time.

TABLE 2

| Percentage Catalyst Fines (by weight) (Remainder Portland Cement) | % $H_2O$ | Compressive Strength Per ASTM C-109 | | |
|---|---|---|---|---|
| | | 24 hrs. | 3 days | 7 days |
| 10% | 48.5 | 1480 | 2710 | 3850 |
| | | 1410 | 2620 | 3850 |
| | | 1420 | 2600 | 3860 |
| | | 1440 | 2640 | 3850 |
| 15% | 48.5 | 1460 | 2580 | 3800 |
| | | 1410 | 2640 | 3810 |
| | | 1450 | 2640 | 3920 |
| | | 1440 | 2620 | 3840 |
| 20% | 48.5 | 1300 | 2670 | 3800 |
| | | 1190 | 2460 | 3940 |
| | | 1200 | 2660 | 3980 |
| | | 1230 | 2580 | 3910 |
| 25% | 48.5 | 1070 | 2420 | 3670 |
| | | 1080 | 2300 | 3560 |
| | | 1090 | 2370 | 3580 |
| | | 1080 | 2360 | 3600 |
| 0% (Control) | | 1610 | 3060 | 3930 |

The following working examples were conducted which further support and illustrate the effectiveness of the disclosed invention.

EXAMPLE 1

400 lbs. cement (Southwestern Type II), 100 lbs. catalyst fines, 1200 lbs. coarse aggregate (slag), 1700 lbs. fine aggregate, water and 38 oz. water reducing agent (Zeecon R-40) were mixed to produce a concrete. The cylindrical test results were as follows:

| CYLINDER TEST RESULTS | | | |
|---|---|---|---|
| Cylinder No. | 1 | 2 | 3 |
| Age | 24 hrs. | 7 days | 14 days |
| Max. Load (lbs.) | 47,000 | 79,500 | 100,000 |
| Comp. Strength (psi) | 1662 | 2812 | 3537 |

EXAMPLE 2

400 lbs. cement (Victor Type II), 1200 lbs. coarse aggregate (¾ inch slag), 100 lbs. catalyst fines, 1700 lbs. fine aggregate (fine slag sand), and 300 lbs. water and 35 oz. water reducing agent (Zeecon R-40). The cylindrical test results were as follows:

| CYLINDER TEST RESULTS | | |
|---|---|---|
| Cylinder No. | 1 | 2C |
| Age | 7 days | 28 days |
| Max. Load(lbs.) | 73,500 | |
| Comp. Strength (psi) | 2600 | |

EXAMPLE 3

400 lbs. cement (Portland Type II), 1200 lbs. coarse aggregate (¾ inch slag), 100 lbs. catalyst fines, 1700 lbs. fine aggregate (fine slag sand), and 300 lbs. water and 38 oz. water reducing agent (Zeecon R-40). The cylinder test results were as follows:

| CYLINDER TEST RESULTS | | | |
|---|---|---|---|
| Cylinder No. | 1 | 2 | 3 |
| Age | 24 hrs. | 7 days | 28 days |
| Max. Load(lbs.) | 35,000 | 73,000 | 108,000 |
| Comp. Strength (psi) | 1238 | 2582 | 3820 |

EXAMPLE 4

400 lbs. Portland cement, 100 lbs. catalyst fines, 1325 lbs. coarse aggregate (¾ inch slag), 1700 lbs. fine aggregate (natural sand), and 300 lbs. water and 38 oz. water reducing agent (Zeecon R-40). Cylindrical test results were as follows:

| CYLINDER TEST RESULTS | | |
|---|---|---|
| Cylinder No. | 1 | 2 |
| Age | 48 hrs. | 7 days |
| Max. Load (lbs.) | 56,000 | 71,000 |
| Comp. Strength (psi) | 1981 | 2511 |

EXAMPLE 5

354 lbs. Portland cement, 117 lbs catalyst fines, 1200 lbs. coarse aggregate, 1700 lbs. fine aggregate, 300 lbs. water and 24 oz. water reducing agent. The cylindrical test results were as follows:

| CYLINDER TEST RESULTS | | | |
|---|---|---|---|
| Cylinder No. | 1 | 2 | 3 |
| Age | 24 hrs. | 7 days | 28 days |
| Max Load (lbs.) | 35,500 | 57,000 | 77,000 |
| Comp. Strength (psi) | 1256 | 2,016 | 2,723 |

EXAMPLE 6

376 lbs. Portland cement, 141 lbs. catalyst fines, 1200 lbs. coarse aggregate, 1700 lbs. fine aggregate, 300 lbs. water, 38 oz. water reducing agent (Zeecon R-40). Cylindrical test results were as follows:

| CYLINDER TEST RESULTS | | | |
|---|---|---|---|
| Cylinder No. | 1 | 2 | 3 |
| Age | 24 hrs. | 7 days | 14 days |
| Max. Load (lbs.) | 24,500 | 75,000 | 78,500 |
| Comp. Strength (psi) | 867 | 2653 | 2776 |

EXAMPLE 7

400 lbs. Portland cement, 100 lbs. catalyst fines 1200 lbs. coarse aggregate, 1700 lbs. fine aggregate, 300 lbs. water and 38 oz. water reducing agent (Zeecon R-40). Cylindrical test results were as follows:

| CYLINDER TEST RESULTS | | |
|---|---|---|
| Cylinder No. | 1 | 2 |
| Age | 7 days | 28 days |
| Max. Load (lbs.) | 69,000 | 101,000 |
| Comp. Strength (psi) | 2,440 | 3575 |

REFERENCES

1. *Van Nostrand's Scientific Encyclopedia*, 5th Edition (1976), p. 471
2. Ibid., P. 470

I claim as my invention:

1. A composition for concrete comprising:
   (a) water,
   (b) fine and coarse aggregate; and
   (c) a cement mixture which in turn comprises from about 20% up to about 25% fines of alumino-silicate petroleum cracking catalysts with the balance being a cementing agent.
2. A method for making concrete comprising:
   (a) mixing a cement mixture which in turn comprises from about 1% up to about 25% fines of alumino-silicate petroleum cracking catalysts with the balance being a cementing agent, and
   (b) adding water and aggregate to said mixture to produce a concrete upon hardening.
3. A method for making a cement mixture comprising mixing a cementing agent and from about 1% up to about 25% catalyst fines produced from spent aluminosilicate catalysts used in refining petroleum.
4. The method of claim 3 wherein said cementing agent comprises Portland cement and slag.
5. A composition for cement comprising:
   (a) a cementing agent, and
   (b) from about 20% up to about 25% catalyst fines produced from spent alumino-silicate catalysts used in refining petroleum.

* * * * *